Figure 1:
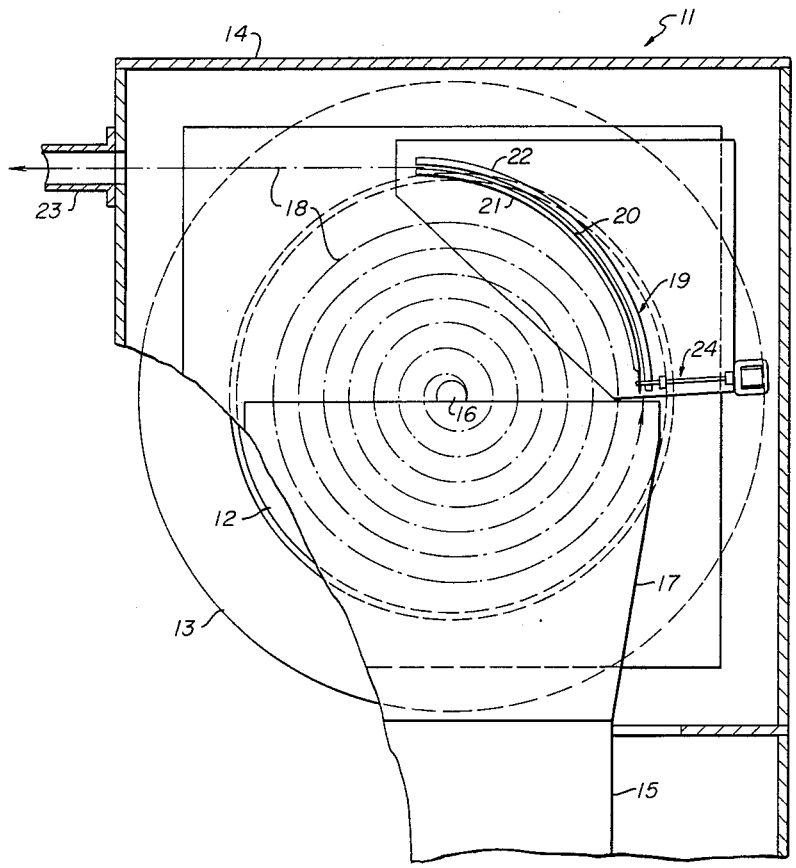

INVENTORS.
RICHARD J. BURLEIGH
BY  RALPH PETERS

ATTORNEY.

Oct. 19, 1965    R. J. BURLEIGH ETAL    3,213,379
ABSORPTION OF ENERGY BY ROTATING DISCS IN
PARTICLE BEAM DEFLECTOR
Filed March 13, 1962    3 Sheets-Sheet 2

INVENTORS.
RICHARD J. BURLEIGH
BY  RALPH PETERS

ATTORNEY.

Oct. 19, 1965  R. J. BURLEIGH ETAL  3,213,379
ABSORPTION OF ENERGY BY ROTATING DISCS IN
PARTICLE BEAM DEFLECTOR
Filed March 13, 1962  3 Sheets-Sheet 3

INVENTORS.
RICHARD J. BURLEIGH
BY  RALPH PETERS

ATTORNEY.

United States Patent Office 3,213,379
Patented Oct. 19, 1965

3,213,379
ABSORPTION OF ENERGY BY ROTATING DISCS IN PARTICLE BEAM DEFLECTOR
Richard J. Burleigh, Berkeley, and Ralph Peters, Lafayette, Calif., assignors to the United States of America as represented by the United States Atomic Energy Commission
Filed Mar. 13, 1962, Ser. No. 179,496
10 Claims. (Cl. 328—234)

This invention relates to accelerators for electrically charged particles and more particularly to beam deflectors for extracting ions therefrom.

In the operation of cyclotrons and certain other forms of charged particle accelerator, a continuing effort has been made to increase external beam intensities. To achieve this highly beneficial result, many problems must be overcome, a prominent one being the difficulty of extracting the increased beam from the accelerator.

A structure commonly used in a cyclotron for this purpose is a deflector formed by a pair of long parallel spaced apart electrodes defining a beam channel which intercepts ions circulating within the final cyclotron orbit and leads gradually outward therefrom. The outer electrode is maintained at a negative electrical potential relative to the inner electrode to draw the ions outwardly.

A difficulty encountered in the use of this structure results from the fact that the forward edge of the inner, or septum, electrode, where the actual separation is made between recirculating ions and those drawn outwardly into the beam channel, is very heavily bombarded by high energy ions. This results in severe heating and burning of the septum edge. Since the septum must of necessity be thin, to avoid absorption of all or nearly all of the ions on this surface, it is very difficult to provide an adequate cooling means. Heretofore this effect has seriously limited the amount of beam which can be extracted without excessive erosion of the septum edge.

The present invention provides for the extraction of a greater beam through the use of a pair of rotating thin co-planar metallic discs to form the leading edge of the septum in a cyclotron. The septum, with its rotating members, presents a continually changing area for receiving the ion bombardment at the point of separation of the outgoing beam of ions from the outer cyclotron orbit and in this manner will dissipate more heat than the formerly used stationary types of septums. The increased heat removal by the septum in turn increases the amount of beam which can be extracted from the cyclotron without damage to the deflector.

Therefore it is an object of the present invention to provide for an increase of the amount of beam which may be extracted from a cyclotron or other ion accelerator.

It is a further object of this invention to reduce the erosion of deflector elements in a cyclotron.

It is an object of this invention to provide an ion beam deflector having means for removing heat from the edges of thin electrodes which are exposed to the beam whereby damage to the electrodes by an intense beam is minimized.

Another object of the present invention is the provision of an improved septum or ion beam parting electrode for an accelerator beam deflector.

A still further object of this invention is to provide means presenting a continually changing area for ion bombardment at the septum edge of an accelerator beam deflector.

Figure 2:
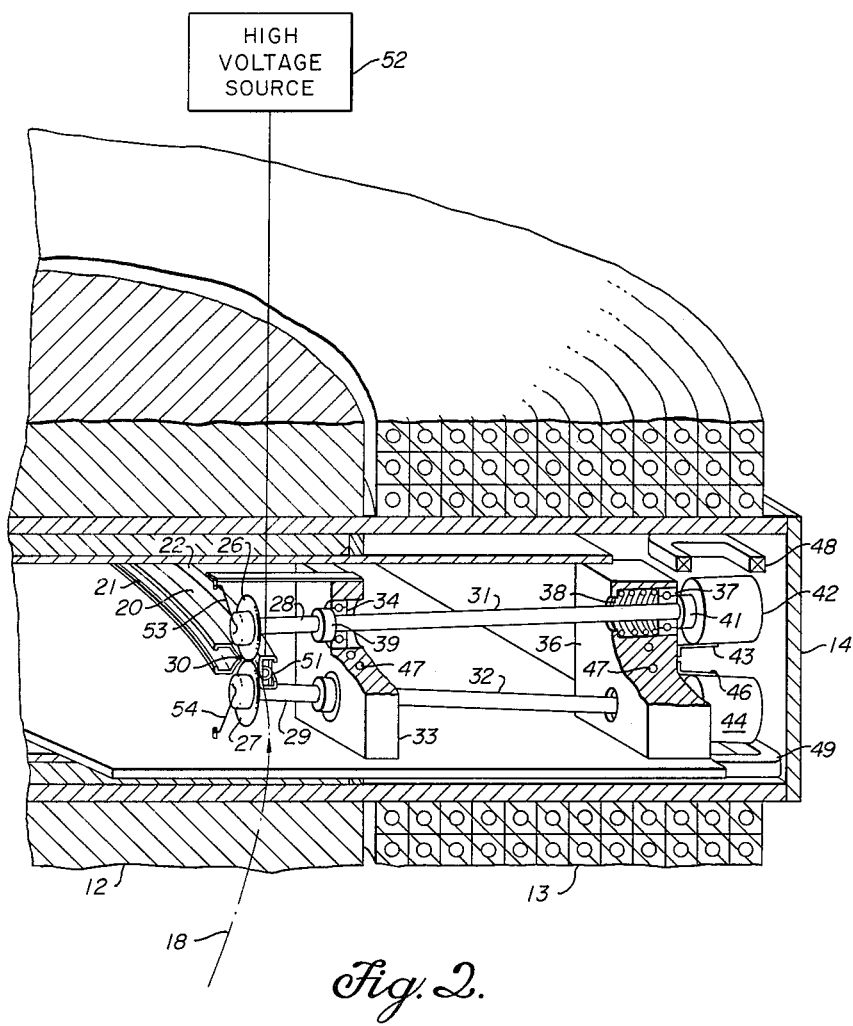
Figure 3:
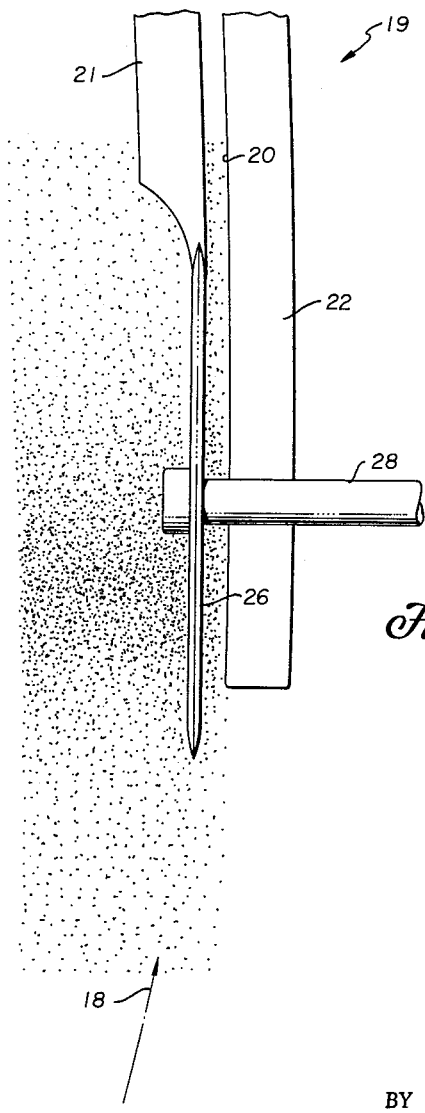

The invention, both as to its organization and method of operation, together with further objects and advantages thereof, will best be understood by reference to the following specification taken in conjunction with the accompanying drawing, of which:

FIGURE 1 is a broken-out plan section view of a cyclotron taken along the central plane of the magnet gap thereof and showing the novel beam deflector therein, and FIGURE 2 is a perspective view of a portion of the cyclotron of FIGURE 1 and showing details of the structure of the beam deflector, and FIGURE 3 is a plan view of a portion of the deflector further illustrating the manner of passage of ions into the beam channel thereof.

Referring now to the drawing, and more particularly to FIGURE 1 thereof, a sectional plan view of certain components of a cyclotron 11 is shown to illustrate a suitable positioning of the present invention therein. The general structure of cyclotrons is well understood within the art and accordingly only so much thereof as is needed for an understanding of the use of the present invention therewith will be herein described.

The cyclotron will typically comprise a pair of cylindrically shaped coaxial spaced-apart magnet pole pieces of which the lower pole 12 is shown in FIGURE 1. The pole pieces 12 are encricled by energizing coils 13 and the magnetic circuit gap between the pole pieces is enclosed by a vacuum tank 14. An ion source 16 is disposed at the center of the magnet gap and a hollow dee electrode 17 is disposed in a 180 degree sector of the gap to provide for the acceleration of ions from source 16 in a manner well understoood within the art. An electrically resonant stem 15 at one side of the vacuum tank 14, provides for the support of dee electrode 17.

Under the influence of an oscillating voltage applied to the dee electrode 17, ions follow an orbit 18 which continually increases in radius as the ions gain speed and energy from repeated passages through the electrical field. To facilitate illustration of the invention, the orbit 18 is shown in FIGURE 1 as increasing in radius at a greater rate than is characteristic of most cyclotrons, and orbit perturbations such as may be introduced by azimuthal field variations are not shown.

A deflector structure 19 is disposed near the outer edge of the magnet gap to intercept high energy ions circulating around the outer portion of the orbit 18 and to guide the ions out of the magnetic field of the cyclotron 11. Typically the deflector 19 is comprised of a pair of long flat electrodes including an inner electrode 21 and outer electrode 22 which are spaced apart and appropriately curved to define an ion passage 20 which intercepts the final ion orbit 18 at the inner end and curves gradually outward therefrom. As will hereafter be described in greater detail, the outer electrode 22 is negatively charged relative to the inner electrode 21 in order to exert the outward force on the ions required to direct the beam along the passage 20. Upon emerging from the outer end of deflector 19, the ions are outside the principal field of cyclotron 11 and travel in a substantially straight line. The extracted beam then leaves the vacuum tank 14 through a suitably placed vacuum tubulation 23 thereon.

Since the forward edge of the inner electrode 21 is exposed to bombardment by high energy ions, the amount of beam which can be extracted has been limited by the need to limit heating and erosion of the electrode edge. The present invention provides a rotating septum mechanism 24 at the forward edge of inner electrode 21 which reduces these undesirable effects.

Referring now to FIGURE 2 in conjunction with FIGURE 1, two co-planar thin flat tungsten discs 26 and 27 are mounted at the inner edge of the inner deflector electrode 21 in alignment therewith, disc 26 being directly above disc 27 with the disc edges being adjacent.

The discs 26 and 27 are each approximately tangent to the plane of ion orbit 18 and each has a radius exceeding one half of the vertical thickness of the beam. In order that the discs 26 and 27 may effectively form a continuous electrode surface with electrode 21, the adjacent edge of the latter is formed in a point 30 which extends between the discs and which has concave sides conforming with the rims of the discs. The upper disc 26 is mounted coaxially on the inner end of a ceramic shaft 28 and the lower disc 27 is similarly mounted on a second ceramic shaft 29, each of the shafts extending radially outward from the cyclotron magnet gap. Ceramic is used for the shafts 28 and 29 because of proximity to the high negative potential of electrode 22. Shaft 28 is directly coupled to a non-magnetic metal shaft 31 and the second ceramic shaft 29 is coupled to a lower and approximately parallel non-magnetic metal shaft 32. A first non-magnetic block 33 is mounted within vacuum tank 14 and has two transverse bores in which two sets of ball bearings 34 are mounted to journal the inner ends of the two shafts 31 and 32. A second non-magnetic block 36 somewhat thicker than the block 33 is provided to support the outer ends of the shafts 31 and 32 by means of a second pair of ball bearings 37. A pair of coil springs 38 are disposed one around each of the shafts 31 and 32 within the bores provided for the bearings 37 in block 36, one end of each spring being mounted against a shoulder in the block 36 and the other end against the outer race of the adjacent bearing 37 thus exerting a force on the shafts 31 and 32 directed outwardly from the magnet gap to hold the shafts in tension. An annular collar 39 on each shaft 31 and 32 just inwardly from bearings 34 restrains outward motion of the shafts. A second annular collar 41 secured on each shaft 31 and 32 just outside bearings 37 provides a means for locking bearings 37 at the proper location on the shafts.

An induction motor 42 is attached by brackets 43 to the block 36 and serves to rotate shaft 31. A similar motor 44 drives shaft 32 and is secured to block 36 by brackets 46. Both blocks 33 and 36 are provided with water channels 47 which are connected to a suitable source of cooling water. Horizontal electrical coils 48 and 49 are mounted directly above and directly below motors 42 and 44 respectively, on the block 36. These coils 48 and 49 provide a magnetic field for neutralizing the fringe magnetic field of the cyclotron 11 at the location of the motors 42 and 44 to assure proper operation thereof.

The outer deflector electrode 22, constructed of non-magnetic metal, has a channel shaped cross-section and is provided with water tubes 51 within the channel form for cooling purposes. The electrode 22 is mounted on insulators with the flat face of the channel parallel to the discs 26 and 27 and spaced outwardly therefrom, in such a manner that the beam of ions 18 passes between the discs 26 and 27 on the inner side and the electrode 22 on the outer side. To provide the outward force on the ions needed to hold the beam 18 between electrodes 21 and 22, a high negative potential is applied to the outer electrode 22 from a suitable source 52. As hereinbefore described, the electrode 22 gradually curves outwardly from the outer ion orbit, with a diminishing curvature, to a point outside the influence of the cyclotron magnetic field.

The inner electrode 21 is at ground potential and also has a channel shaped cross section. The flat side of the electrode 21 channel is spaced a small distance from the flat surface of the outer electrode 22 to define the ion passage 20 therebetween.

A grounded molybdenum wire brush 53 bears against the center portion of the disc 26 in order to remove any electrical charge that may build up on the disc and a second brush 54 bears against the center portion of disc 27 for a similar purpose.

In operation, and with reference to both FIGURES 1, 2 and 3 ions circulating around the outer portion of the cyclotron orbit 18 will pass between the discs 26 and 27 and the outer deflector electrode 22 and enter deflector passage 20. Owing to the electrical field between the electrodes 21 and 22 the ions are drawn radially outward from the normal cyclotron orbit to follow the deflector passage 20 to the beam exit tubulation 23. Factors which determine the curvature of the electrodes 21 and 22 and the potential difference applied therebetween are well understood within the art, and are not significantly altered by the present invention.

During the foregoing process, a certain proportion of the ions intercepted from the final revolution of orbit 18 will strike the edges of the discs 26 and 27. Intense bombardment of a fixed thin metallic element in this manner would produce deleterious localized heating and erosion. Owing to the continual rotation of the discs 26 and 27 by the motors 42 and 44 however, these effects are minimized since the bombardment is in effect spread over a greater area than occurs in the conventional structure wherein a stationary electrode edge continually receives the ion bombardment. Accordingly, the invention allows a greater proportion of the beam 18 to be extracted for a given set of operating conditions.

Although the invention has been disclosed with respect to a preferred embodiment it will be evident to those skilled in the art that many variations are possible within the spirit and scope of the invention. Therefore it is not intended to limit the invention except as defined by the following claims.

What is claimed is:

1. Mechanism for reducing erosion of the edge of an electrode which intercepts a charged particle beam comprising, in combination, a pair of thin flat co-planar discs rotatably mounted at said edge of said electrode in alignment therewith, said discs being disposed on opposite sides of said beam in a substantially tangential relationship therewith, and drive means for rotating each of said discs.

2. Mechanism as described in claim 1 wherein said edge of the electrode is formed with a pointed portion extending between said discs and conforming to the rims thereof whereby said discs are effectively continuous with said electrode.

3. In a mechanism for deflecting at least a portion of a charged particle beam from an initial trajectory thereof, the combination comprising a pair of electrodes spaced apart to define a beam passage leading away from said initial beam trajectory, a first end of a first of said electrodes being proximal to said beam, a thin flat movable element disposed at said first end of said first electrode in alignment therewith and intercepting at least a portion of said beam, and drive means coupled to said movable element whereby different portions of the edge thereof may be presented to said beam.

4. A mechanism for extracting ions from a beam thereof comprising spaced apart first and second electrodes defining a passage leading away from said ion beam, said first electrode having a first end adjacent said beam, a pair of co-planar rotatable thin discs disposed between said beam and said first end of said first electrode in alignment with said first electrode, said discs effectively forming a continuation of said first end of said first electrode for intercepting a portion of said beam, means applying a potential difference between said first and second electrodes, and drive motor means coupled to each of said discs for effecting rotation thereof.

5. In a charged particle accelerator beam extractor of the class having a pair of long arcuate spaced apart inner and outer electrodes having an electrical field therebetween and defining a beam channel for guiding ions entering the forward end therof along an arcuate path, the combination comprising at least one thin disc rotatably mounted at the forward end of said inner electrode in substantially co-planar relationship thereto and effectively forming the forward edge thereof, and a drive means coupled to said disc for rotation thereof whereby a continually changing edge of said disc is presented for bombardment by ions directed toward said forward edge of said inner electrode.

6. In a charged particle accelerator beam extractor of the class having a pair of long arcuate spaced apart inner and outer electrodes having an electrical field therebetween and defining a beam channel for guiding ions entering the forward end thereof outwardly from said accelerator, the combination comprising a pair of thin rotatable discs mounted at the forward end of said inner electrode in substantially co-planar relationship thereto and effectively forming a leading edge thereof for intercepting said beam, each of said discs having a radius exceeding one half the width of said beam, and drive means coupled to said discs for rotation thereof whereby a continually changing edge is presented for bombardment by ions directed toward said forward end of said inner electrode.

7. In a charged particle accelerator beam extractor of the class having a pair of long arcuate spaced apart inner and outer electrodes having an electrical field therebetween and defining a beam channel for guiding ions entering the forward end thereof along an arcuate path, the combination comprising a pair of thin discs rotatably mounted at said forward end of said inner electrode in substantially co-planar relationship thereto and means providing a similar electrical potential for said discs and said inner electrode whereby said discs effectively form a beam intercepting edge of said inner electrode.

8. In a cyclotron of the class having a pair of cylindrical coaxial magnet poles spaced apart to form a field gap and having means accelerating ions around a spiral orbit substantially at the median plane of said gap, a beam extractor comprising a pair of long electrodes spaced apart to form a beam channel aligned with said median plane and directed gradually outward from said field gap, the inner edge of the innermost of said electrodes being adjacent the outer turns of said spiral orbit, a power supply establishing a potential difference between said electrodes, a pair of thin rotatable discs mounted at said inner end of said innermost electrode in alignment therewith, said discs being disposed one on each side of said median plane in substantially tangential relationship therewith, and rotary drive means coupled to each of said discs.

9. Apparatus as described in claim 8 wherein said discs are mounted on electrically insulating shafts, and comprising the further combination of means electrically connecting said discs with said innermost electrode.

10. Apparatus as described in claim 8 wherein said inner end of said innermost electrode is formed in a point extending between said discs and having concave edges conforming to the adjacent rims of said discs.

References Cited by the Examiner
UNITED STATES PATENTS

| | | | |
|---|---|---|---|
| 1,643,453 | 9/27 | Holst | 313—60 X |
| 2,468,942 | 5/49 | Oosterkamp et al. | 313—60 X |
| 2,594,564 | 4/52 | Kehrli | 313—60 X |
| 2,626,359 | 1/53 | Weber | 313—62 X |

ROBERT SEGAL, *Primary Examiner.*

ARTHUR GAUSS, *Examiner.*